United States Patent [19]
Ohnishi et al.

[11] 4,302,966
[45] Dec. 1, 1981

[54] METHOD OF ASSEMBLING A WHEEL TIRE

[75] Inventors: Hiroshi Ohnishi, Kunitachi; Hiroshi Fukuyama, Higashimurayama; Yasushi Yokota, Kawasaki, all of Japan

[73] Assignee: Bridgestone Tire Company Limited, Tokyo, Japan

[21] Appl. No.: 115,325

[22] Filed: Jan. 25, 1980

[30] Foreign Application Priority Data

Jan. 30, 1979 [JP] Japan .................................. 54-8677

[51] Int. Cl.³ ............................................ G01M 1/14
[52] U.S. Cl. ........................................... 73/66; 73/459
[58] Field of Search ............ 73/66, 459, 480, 482–484

[56] References Cited

U.S. PATENT DOCUMENTS 3,864,980 2/1975 Barnes .................................. 73/484

Primary Examiner—James J. Gill
Attorney, Agent, or Firm—Sughrue, Mion, Zinn, Macpeak & Seas

[57] ABSTRACT

A method of assembling a wheel tire to a tire rim as a tire wheel is disclosed. The method comprises steps of measuring dynamic balances of a rim and a tire wheel formed by securing a tire to the rim, seeking static balances of the rim and the tire from these dynamic balances, and securing the tire to the rim by directing the direction of the static balance of the tire at 180° opposite to the direction of the static balance of the rim.

1 Claim, 4 Drawing Figures

4,302,966

METHOD OF ASSEMBLING A WHEEL TIRE

BACKGROUND OF THE INVENTION

The present invention relates to a method of assembling a wheel tire to a tire rim, and more particularly, to a method of assembling a wheel tire to a tire rim as a tire wheel for the purpose of mitigating vibration of a vehicle generated when an assembled position of the tire relative to the rim is improper.

Now when automobiles generally run at high speed accompanied by the spread of expressways and the improvement of pavements, consumers have a good knowledge of automobiles and tires. The vibration of a vehicle or an automobile during running at high speed often becomes a problem.

The vibration due to tire wheels among such vibrations of automobiles is mainly generated by an unbalance of weight, size and rigidity of a tire and an unbalance of weight and size of a rim.

The unbalance of weight can be improved by measuring an unbalance of a tire wheel formed by securing a tire to a rim with a balancer and securing a weight of a desired weight at a specified position of the rim. The unbalance of size and rigidity can be improved by measuring non-uniformity of a rim size and non-uniformity of a tire size and rigidity and assembling the tire with the rim to cancel any non-uniformity of the rim and the tire with each other.

However, the latter device for measuring the non-uniformity of the rim and the tire is very expensive, so that an enormous expense is incurred for preparing the number of such devices sufficient enough to dissolve the vibration problem of wheels.

Hitherto, it has been a common practice to provide a standard rim having uniform size and weight, to secure a tire to this standard rim, to measure dynamic balances (an unbalance amount and the securing position of a balance weight) of both sides of the tire by a balancer, to measure dynamic balances of both sides of a rim to be used, to obtain static balances (a vector sum when calculating the balances of both sides as a vector at the center of a wheel) of the tire and the rim from these dynamic balances, and to secure the tire to the rim by directing the static balance of the tire toward 180° opposite to the direction of the static balance of the rim.

Therefore, the conventional method has such a problem that each kind of standard rims in response to the tire size should be provided.

SUMMARY OF THE INVENTION

It is an object of the present invention to resolve the above described problems of the conventional device.

It is another object of the present invention to provide a method of assembling a wheel tire to a tire rim in which the vibration due to the unbalance of a size and a rigidity is mitigated to a sufficiently satisfactory extent in actual use with the use of a balancer which has only been used for preventing vibration due to the unbalance of a weight, and an amount of the balance weight used is also minimized.

According to the present invention a method of assembling a wheel tire to a tire rim comprises steps of measuring dynamic balances of a rim and a tire wheel formed by securing a tire to the rim, seeking static balances of the rim and the tire from these dynamic balances, and securing the tire to the rim by directing the direction of the static balance of the tire at 180° opposite to the direction of the static balance of the rim.

The present invention has been accomplished on the basis of the following recognition.

(1) The static balance of a tire wheel is combined by a static balance of a tire and that of a rim, so that the static balance of the tire is sought as a difference of the static balance of the tire wheel and the static balance of the rim.

(2) The tire is secured to the rim by directing the direction of the static balance of the rim and the direction of the static balance of the tire toward 180° opposite to each other, thereby to suitably assemble the tire to the rim.

(3) The position of a large size and the position of a high rigidity are existent on the line at 180° opposite to the direction of about the static balance.

DESCRIPTION OF THE PREFERRED EMBODIMENT

Figure 1A:
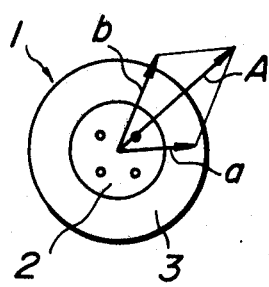
FIGS. 1a, 1b, and 1c are explanatory views showing each step of a method of assembling a wheel tire to a tire rim according to the invention.

Referring now to the drawing one embodiment of a method for assembling a wheel tire to a tire rim according to the present invention will be explained.

Figure 1B:
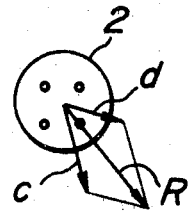
Figure 1C:
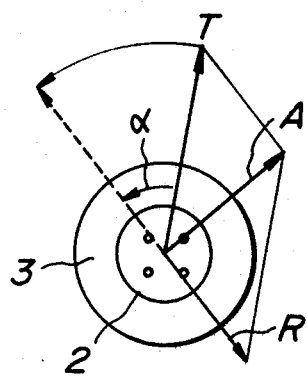

In the present invention, dynamic balances a, b and c, d of both sides of a tire wheel 1 and a rim 2 are measured by a balancer as shown in FIGS. 1a and 1b, and a static balance A of the tire wheel 1 is sought from the dynamic balances a, b, while a static balance R of the rim 2 is sought from the dynamic balances c, d, and then a static balance T of the tire 3 is sought from a difference between the static balance A and the static balance R as shown in FIG. 1c, and the tire 3 is secured to the rim 2 by directing the direction of the static balance T toward 180° opposite (the side of a broken line) to the direction of the static balance R.

Figure 2:
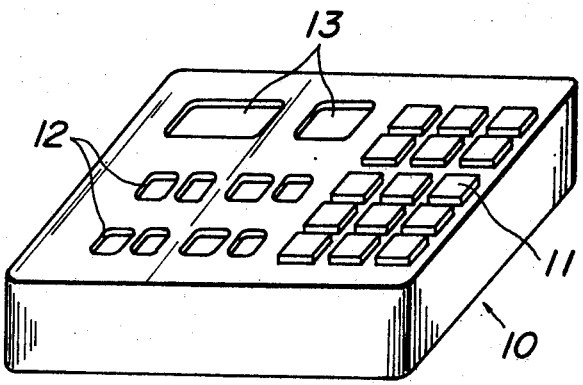
FIG. 2 is a perspective view showing a computer used for a calculation of a dynamic balance and a static balance obtained by a wheel balancer.

The above feature will be explained with reference to an embodiment. At first, the dynamic balance of the rim is measured by a balancer, and the thus measured value is supplied to for example a computer 10 as shown in FIG. 2. In case of supplying the measured value, if the balancer is a type of displaying dynamic balances of both sides, the dynamic balance of the surface is inputted by a keyboard 11 at first, and then the dynamic balance of the back is inputted using the keyboard. Moreover, if the balancer is a type of combining (the static balances) and displaying both sides, the static balance inputted first followed by a zero input. Then, the tire wheel is also measured by the balancer and the thus measured value inputted using the keyboard 11. These input signals are digitally displayed on for example an input display portion 12, and as a result, confirmation of the keyboard operation can be obtained.

An operation portion (not shown) combines respectively dynamic balances based on each input signal, computes the static balances of the rim and the tire, further computes a difference between the static balance of the tire wheel and the static balance of the rim and determines the static balance of a tire. This computed result is displayed on an output display portion 13, and from this display is obtained a difference α between the desired static balance direction and the actual static balance direction of the tire shown by a broken line in FIG. 1c.

Therefore, after the above calculation, the tire is assembled with the rim by directing the direction of the actual static balance of the tire toward the desired static balance, and the dynamic balance of the tire wheel is finally measured by the balancer and the balance weight of a predetermined weight is secured to the predetermined position.

In addition, in this embodiment, use is made of a computer separated from the balancer, but it is possible to assemble the computer with the balancer or to calculate the balances without using any computer.

According to the present invention, with the aid of a balancer which has only been used for improving the unbalance of a weight, the unbalances of a size and a rigidity can comparatively easily be improved, the vibration due to the tire wheel can remarkably be mitigated, the standard rim and the very expensive measuring device are not required, and an amount of the balance weight used can be minimized.

What is claimed is:

1. In a method of balancing and assembling wheels with tires wherein any unbalance of a tire and a rim are determined and the tire is secured to the rim in a position so that the vectors of balance necessary to achieve static balance of the tire and the rim separately are at least approximately directed opposite each other and any remaining unbalance is compensated by dynamically balancing the tire and the rim, the improvement comprising the steps of: determining the static balance force (R) of the rim by dynamic measurement of the balance; mounting the tire to the rim in any desired angular position without previously determining its unbalance or the corresponding static balancing force (T), determining by dynamic measurement of any unbalance the static balancing force (A) necessary for statically balancing the assembled tire and rim; determining the static balancing force (T) by vectorially substracting (T=A−R) the static balancing force of the (R) from the static balancing force of the assembled tire and rim (R) and, turning the tire on the rim so that the balancing force (T) is directed opposite the balancing force (R) of the rim.

* * * * *